United States Patent
MacKean et al.

(10) Patent No.: US 10,888,045 B2
(45) Date of Patent: Jan. 12, 2021

(54) WEEDING ROBOT AND METHOD

(71) Applicant: Franklin Robotics, Inc., North Billerica, MA (US)

(72) Inventors: Rory MacKean, Concord, MA (US); Joseph L. Jones, Acton, MA (US); James T. Francis, Jr., Merrimack, NH (US)

(73) Assignee: Franklin Robotics, Inc., North Billerica, MA (US)

( * ) Notice: Subject to any disclaimer, the term of this patent is extended or adjusted under 35 U.S.C. 154(b) by 3 days.

(21) Appl. No.: 15/435,660

(22) Filed: Feb. 17, 2017

(65) Prior Publication Data

US 2017/0238460 A1 Aug. 24, 2017

Related U.S. Application Data

(60) Provisional application No. 62/298,188, filed on Feb. 22, 2016.

(51) Int. Cl.
*A01D 34/00* (2006.01)
*A01D 34/416* (2006.01)
(Continued)

(52) U.S. Cl.
CPC .......... *A01D 34/008* (2013.01); *A01M 21/02* (2013.01); *G05D 1/0246* (2013.01); *G05D 2201/0201* (2013.01)

(58) Field of Classification Search
CPC .... A01D 34/008; A01D 34/863; A01D 34/84; A01D 34/47; A01D 34/416; A01D 34/10;
(Continued)

(56) References Cited

U.S. PATENT DOCUMENTS 3,708,967 A 1/1973 Geist et al.
5,166,679 A * 11/1992 Vranish ................. B25J 13/086
324/687
(Continued)

FOREIGN PATENT DOCUMENTS

WO 0074465 A1 12/2000
WO 2014111387 A1 7/2014
WO 2015064780 A1 5/2015

OTHER PUBLICATIONS

Robert L. Zimdahl, "Fundamentals of Weed Science", p. 308, Elsevier Science (2013), (six (6) pages).
(Continued)

*Primary Examiner* — Hunter B Lonsberry
*Assistant Examiner* — Mathew Franklin Gordon
(74) *Attorney, Agent, or Firm* — Sunstein LLP

(57) ABSTRACT

An autonomous garden weeding robot includes a chassis, a motorized cutting subsystem, and a drive subsystem for maneuvering the chassis. A weed sensor subsystem is located on the chassis at a first elevation from the ground and a crop/obstacle sensor subsystem is located on the chassis at a second, higher elevation from the ground. The drive subsystem is controlled to maneuver the chassis about a garden. Upon detection of a weed, the motorized cutting subsystem is energized to cut the weed. The motorized cutting subsystem is de-energized after the chassis has moved a predetermined distance and/or after a predetermined period of time. Upon detection of a crop or obstacle, the drive subsystem is controlled to maneuver the chassis away from the obstacle.

11 Claims, 9 Drawing Sheets

(51) Int. Cl.
*G05D 1/02* (2020.01)
*A01M 21/02* (2006.01)

(58) Field of Classification Search
CPC ........... A01D 34/02; G05D 2201/0201; G05D 1/0214; A01M 21/02
See application file for complete search history.

(56) References Cited

U.S. PATENT DOCUMENTS

| | | | |
|---|---|---|---|
| 5,442,552 A | 8/1995 | Slaughter et al. | |
| 5,539,292 A | 7/1996 | Vranish | |
| 6,764,373 B1* | 7/2004 | Osawa | B25J 19/005 180/169 |
| 7,032,369 B1* | 4/2006 | Eaton | A01B 41/06 172/6 |
| 8,381,501 B2 | 2/2013 | Koselka et al. | |
| 10,037,038 B2* | 7/2018 | Sandin | B60L 50/52 |
| 2002/0049522 A1 | 4/2002 | Ruffner | |
| 2011/0054686 A1 | 3/2011 | Lee et al. | |
| 2013/0345876 A1 | 12/2013 | Rudakevych | |
| 2014/0054099 A1* | 2/2014 | Ho | G05D 1/0263 180/168 |
| 2014/0121881 A1* | 5/2014 | Diazdelcastillo | A01D 42/00 701/23 |
| 2014/0260148 A1* | 9/2014 | Jens | A01M 21/02 56/10.2 R |
| 2016/0157414 A1* | 6/2016 | Ackerman | A01B 69/008 701/25 |
| 2016/0354931 A1 | 12/2016 | Jones et al. | |
| 2017/0240041 A1* | 8/2017 | Jong | B60K 16/00 |

OTHER PUBLICATIONS

Ward et al., "A Dyamic-Model-Based Wheel Slip Detector for Mobile Robots on Outdoor Terrain", IEEE Transactions on Robotics, vol. 24, No. 4, Aug. 2008, pp. 821-831.
"Lely Weeder", Data Sheet, http://www.lely.com/uploads/original/Turfcare_US/Files/WeederSpecSheet_FINAL.pdf, Lely USA, Inc., P.O. Box 437, Pella, Iowa 50219, © 2008 (two (2) pages).
Rodney A. Brooks, "A Robust Layered Control System for a Mobile Robot", IEEE Journal of Robotics and Automation, vol. RA-2, No. 1, Mar. 1986, pp. 14-23.
Press Release "Agritechnica trade fair, Nov. 10-14, Sensors, apps, and robots: Bosch startup uses smart technology to support farmers. Automatic image recognition for improved yields",Nov. 6, 2015, PI 9110 RB Res/KB, http://www.bosch-presse.de/presseforum/details.htm?txtID=7361&tk_id=166, Robert Bosch GmbH, Posffach 10 60 50, D-70049 Stuttgart, (four (4) pages).
Wikipedia, "Glyphosate", https://en.wikipedia.org/wiki/Glyphosate, Mar. 21, 2017, (nineteen (19) pages).
Joe Jones, "The Practical Roboticist", http://thepracticalroboticist.com, May 2015, (five (5) pages).
Evan Ackerman, "Roomba Inventor Joe Jones on His New Weed-Killing Robot, and What's So Hard About Consumer Robotics", IEEE Spectrum, Jul. 6, 2017, 7 pages, (online) <URL: https://spectrum.ieee.org/automaton/robotics/home-robots/roomba-inventor-joe-jones-on-weed-killing-robot.
Franklin Robotics, "Tertill Kickstarter Video", Jun. 13, 2018, (online) <URL: https://www.youtube.com/watch?v=VwTWhMbnq9g.
International Searching Authority—International Search Report—International Application No. PCT/US18/00210, dated Dec. 18, 2018, 5 pages.

* cited by examiner

WEEDING ROBOT AND METHOD

RELATED APPLICATIONS

This application claims benefit of and priority to U.S. Provisional Application Ser. No. 62/298,188 filed Feb. 22, 2016, under 35 U.S.C. §§ 119, 120, 363, 365, and 37 C.F.R. § 1.55 and § 1.78, which is incorporated herein by this reference.

FIELD OF THE INVENTION

This subject invention relates to robots, preferably an autonomous garden weeding robot.

BACKGROUND OF THE INVENTION

Weeds reduce yields because they steal water, nutrients, and sunlight from food crops. This represents a significant challenge to all growers. One source states, "Currently, weed control is ranked as the number one production cost by organic and many conventional growers" see *Fundamentals of Weed Science*, $4^{th}$ edition, Robert L. Zimdahl, page 308 incorporated herein by this reference. Furthermore, the weed problem is worsening as weeds become resistant to common herbicides. See https://en.wikipedia.org/wiki/Glyphosate incorporated herein by this reference.

Mechanical eradication of weeds would solve the problem of herbicide resistance. Accordingly, this strategy has been pursued by many. See, for example, http://www.bosch-presse.de/presseforum/details.htm?txtID=7361&tk_id=166, incorporated herein by this reference. The challenge is constructing cost-effective implements able to discriminate between weeds and desired crops. Purely mechanical methods are available commercially (see, e.g. http://www.lely.com/uploads/original/Turfcare_US/Files/Weeder-SpecSheet_FINAL.pdf, incorporated herein by this reference) but are limited in scope. Vision-based methods have not yet proven commercially successful possibly because of the great similarity between weeds and crops during some parts of the growth cycle. See also U.S. Published Patent Application Serial No. 2013/0345876 and U.S. Pat. Nos. 5,442,552 and 8,381,501 all incorporated herein by this reference.

BRIEF SUMMARY OF THE INVENTION

The present invention offers a mechanical eradication method directed by sensors able to discriminate between weeds and crops and does so preferably without resort to computer vision. Instead it uses highly reliable but extremely low-cost sensors arranged in a particular way.

Featured is a weeding robot comprising a chassis, a motorized cutting subsystem, and a drive subsystem for maneuvering the chassis. A weed sensor subsystem on the chassis is at a first elevation from the ground. A crop/obstacle sensor subsystem on the chassis is at a second, higher elevation from the ground. A controller subsystem is responsive to the weed sensor subsystem and the crop/obstacle sensor subsystem and is configured to: control the drive subsystem to maneuver the chassis about a garden, upon detection of a weed, energize the motorized cutting subsystem to cut the weed and upon detection of a crop or obstacle, control the drive subsystem to maneuver the chassis away from the obstacle. Preferably the controller subsystem is further configured to de-energize the motorized cutting subsystem after the chassis has moved a predetermined distance and/or after a predetermined period of time. The controller subsystem is preferably further configured to maneuver the chassis about the garden in a random or deterministic pattern.

The weeding robot may further include at least one battery carried by the chassis for powering the motorized cutting subsystem and the drive subsystem and at least one solar panel carried by the chassis for charging the at least one battery. The controller subsystem may further be configured to de-energize the drive subsystem when the battery power is below a predetermined level.

In one example, the motorized cutting subsystem includes a motor proximate the front of the chassis with a shaft carrying a string rotated below the chassis. In one example, the drive subsystem includes four motorized wheels. Preferably, the weed sensor subsystem may include at least one capacitance sensor located under the front of the chassis and the crop/obstacle sensor subsystem includes right and left forward mounted capacitance sensors. The capacitance sensors may be capaciflector proximity sensors.

Also featured is an autonomous weeding robot comprising a chassis, a battery, at least one solar panel on the chassis for charging the battery, a motorized cutting subsystem powered by the battery, and a drive subsystem for maneuvering the chassis and powered by the battery. At least one capacitance weed sensor is located under a forward portion of the chassis and at least one crop/obstacle capacitance sensor is located on the forward portion of the chassis. A controller subsystem, responsive to the capacitance weed sensor and the capacitance crop/obstacle sensor is configured to: control the drive subsystem to maneuver the chassis about a garden, upon detection of a weed, energize the motorized cutting subsystem to cut the weed, de-energize the motorized cutting subsystem after the chassis has maneuvered a predetermined distance and/or after a predetermined period of time, and upon detection of a crop or obstacle, control the drive subsystem to maneuver the chassis away from the obstacle.

Also featured is a garden weeding method comprising equipping an autonomous robot with a motorized cutting subsystem, maneuvering the robot about a garden, detecting a weed, upon detection of the weed, energizing the motorized cutting subsystem to cut the weed, detecting a crop or obstacle, and upon detection of the crop or obstacle maneuvering the robot away from the obstacle. The method may further include de-energizing the cutting subsystem after the robot has moved a predetermined distance and/or after a predetermined period of time.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1A:
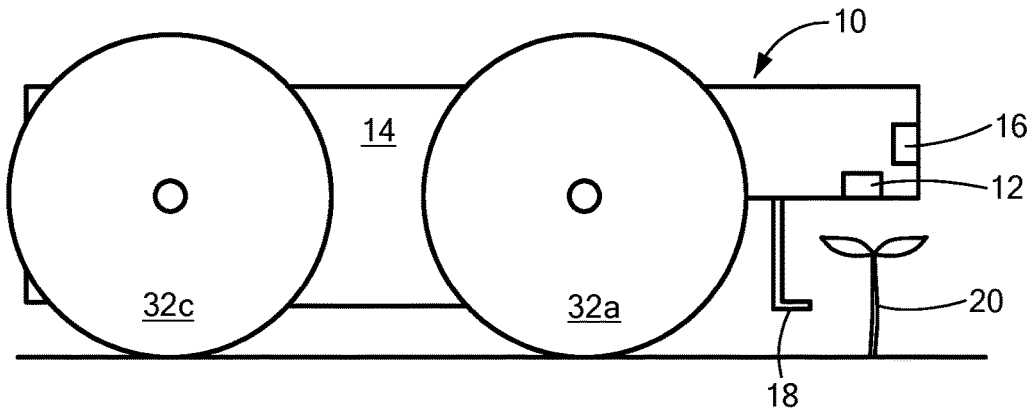
FIG. 1A is a schematic side view of an example of a weeding robot detecting a weed to be cut.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Disclosed is a mobile robot-based system that eradicates weeds from home gardens. The robot preferably includes an outdoor mobility platform, a renewable power source, sensors able to detect the boundary of the robot's designated operating area, sensors able to detect obstacles, one or more sensors that can detect weeds, and a mechanism for eliminating weeds. Optionally included are a mechanism for driving pests out of the garden, a system for collecting information about soil and plants, and a system for collecting images of plants in the garden for offline analysis of plant health and/or visualization of growth over time. Note that the images may be correlated with robot position for tracking individual plants.

The mobility platform may include four drive wheels each powered by an independent motor controlled by a common microprocessor. One or two top-mounted photovoltaic cells provide power. A preferred garden boundary sensor may be based on capacitance. An obstacle detection sensor may be used as a secondary boundary detection sensor. The primary obstacle detection sensor is preferably based on capacitance. The secondary obstacle sensor may be virtual. It may monitor wheel rotation, drives motor PWM, three orthogonal accelerometers, three orthogonal gyros, and/or other signals. A computer algorithm combines these signals to determine when the robot is being prevented from moving by an obstacle. The weed sensor, mounted on the bottom of the robot's chassis, is also preferably based on capacitance.

The weed eradicating mechanism preferably includes a motor-driven, rapidly-spinning plastic (e.g., nylon) string. One-bit pyroelectric motion sensors can be used to detect the presence of pests.

Key abilities of the preferred robot include the ability to operate indefinitely without supervision and prevent weeds from becoming established. The robot's small size allows operation in narrow rows and low weight eliminates soil compaction problems. Pests do not acclimate to the robot.

The robot is designed to eradicate weeds for home gardeners and small-scale agricultural producers. Placed in the garden in the early spring—before weeds have sprouted—the robot maintains a weed-free garden for the entire growing season.

Each day the robot collects solar energy and stores it in a battery. Periodically, when sufficient energy is available, the robot moves about the garden. Whenever it detects a weed the robot activates its weed cutting mechanism. Because weeds are attacked on a daily basis, cutting weeds—rather than pulling them up by the roots—is sufficient to ensure a weed-free environment.

The robot may possess sufficient autonomy and mobility that it can operate indefinitely in a typical garden with only infrequent assistance from the user. The robot may be programmed using a behavior-based scheme. See "A robust layered control system for a mobile robot," R. Brooks, *IEEE Journal of Robotics and Automation*, Vol 2. Issue 1 incorporated herein by this reference. Behaviors and operating parameters are designed in such a way that the robot covers all accessible parts of the garden with high likelihood. Furthermore, the robot detects conditions that can lead to immobilization and acts to avoid or escape from such situations.

The present invention solves the weed/crop discrimination problem preferably using relative size—tall objects are considered crops, short objects are weeds. Capacitive sensors embedded in the front of the robot's shell (the obstacle sensors) detect tall objects, similar sensors under the shell (the weed sensors) detect any plant short enough to be overrun by the robot. When the robot detects a tall object it turns away and chooses another path. But, when a short plant activates the under-shell sensor, the robot switches on the weed cutting mechanism. The robot may then wait a short time and/or move a short distance. Afterward the weed cutting mechanism is de-energized to save battery power.

Capacitance sensors are very effective at detecting objects that are to some degree conductive and are connected to ground. This description fits living weeds, plants, and the metal fence that often surrounds a garden. In one design, a chip-based capacitive sensor is used that also includes a shield. The shield is an electrode maintained at the same potential as the sensing electrode but that is electrically isolated from the sensing electrode. This arrangement (originally called a "Capaciflector," see U.S. Pat. No. 5,166,679, incorporated herein by this reference, eliminates parasitic capacitances that would otherwise confuse the sensor. It also makes it possible to control the direction of the sensing. Objects behind the sensor are ignored and only objects toward its front are detected.

Not all object the robot encounters are conductive and connected to ground. Because of this, the robot may have at least one additional collision sensing modality. As one example, observing wheel rotation, commanded wheel power, accelerometers, and gyroscopes are used. See for example, *A Dynamic-ModelBased Wheel Slip Detector for Mobile Robots on Outdoor Terrain*, Iagnemma & Ward, IEEE Transactions on Robotics, Vol. 24, No 4, August 2008, incorporated herein by this reference.

The weed eradication mechanism preferably includes a spinning plastic (e.g., nylon) string. See, for example U.S. Pat. No. 3,708,967 incorporated herein by this reference.

A short barrier may be erected around the garden in order to keep the robot confined. A conductive barrier, say a wire fence, can be detected by the robot's forward capacitive sensor. Whenever the robot encounters the barrier it turns back into the garden. A non-conductive physical barrier, say a plastic fence, may be detected by the robot's virtual collision sensor.

The navigation scheme the robot uses will be determined by the available sensors. With no range measuring sensors the robot may use random or deterministic paths to effect coverage. However, if the robot incorporates a camera, RFID reader, or other sensor able to recognize specific positions a more determinist form of navigation (such as SLAM—simultaneous localization and mapping, for example) will be used. In this case, the robot will be able to cover the garden more efficiently, and therefore cover a larger garden with a given battery capacity/photovoltaic cell area.

Although the robot uses plant height to discriminate between mature crops and small weeds, the robot is nevertheless compatible with crops grown from seed. When the seed is planted the user may anchor a short collar made of conductive material in such a way that the plant will grow up through the collar. When the robot encounters the collar it turns away, avoiding the small growing plant.

One or more motion sensors may be mounted on the robot chassis. This enables the robot to detect pests, e.g. rabbits and birds. When the robot senses nearby motion it moves in the direction of the motion and possibly turns on its weed cutter. These actions will be effective at driving away most pests. Because the robot actually approaches the pest, pests should not become acclimated to the robot.

Additional environmental sensors may be incorporated into the robot. Such sensors could record rainfall, soil moisture, plant health, and so on. The robot would accumulate this and other data and periodically relay it to the user. Such information allows the user to tend the crops more effectively.

A camera subsystem can be incorporated into the robot to assist with navigation (as noted above), but it also can be used to take images or video of the plants. If the robot has determined its location, these images could be tagged with that location to be able to identify individual plants over a time series of images. These images could be stored on the robot until they are able to be uploaded to a service we host for manual analysis to make recommendations to the user for improving the plant's health, automated analysis to make recommendations to the user for improving the plant's health, and/or time-lapse video of the plant's growth over time.

Some of the behaviors or functions incorporated into the robot may include Wait-for-power—The robot halts so as to minimize power consumption while it collects solar energy and charges its battery. Cover-garden—The robot navigates about the garden attempting to give equal attention to all areas. Escape-from-collision—When either the forward capacitive detects a tall obstacle or the virtual collision sensor determines that the robot is not moving, pick a different direction of travel. Avoid-slope—The slope on which the robot is traveling may become too steep for safe operation. When this happens the robot will move toward a less hazardous position. Avoid-immobilization—Soft terrain, vegetation, or other issues may cause excessive wheel slip or other conditions the robot can interpret as precursors to immobilization. When this happens the robot acts to move to a safer area. Cut-weeds—When the weed sensor detects a weed the robot activates its string trimmer. Confront-pest—The robot monitors its motion sensors any time it is idle. If it senses a pest nearby the robot moves to confront the pest and drive it away. Inverted-shutdown—If the robot tumbles, landing wheels up it disables motor power. (The user must press a button to restart motion.)

FIG. 1A shows an example of autonomous ground robot 10 with a drive subsystem including driven wheels 32a and 32c. Capacitance weed sensor 12 is preferably located under the forward portion of chassis 14 and capacitive crop/obstacle sensor 16 is preferably mounted higher up and on the front of chassis 14. Weed 20 is detected by weed sensor 12 and in response motorized weed cutter 18 is energized. Optionally, the cutter 18 is energized as robot 10 drives forward. The weed 20 is cut and thereafter the weed cutter 18 is de-energized and turned off (e.g., after a predetermined period of time).

Figure 1B:
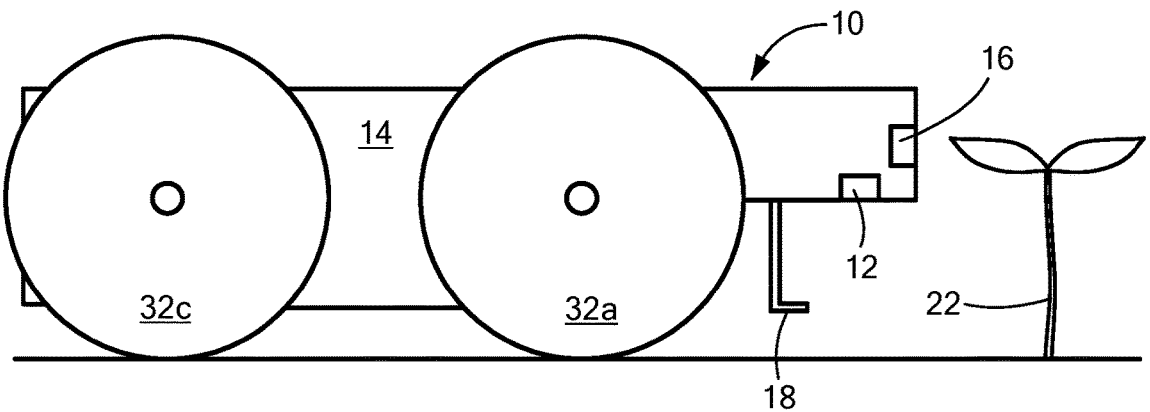
FIG. 1B is a schematic side view of an example of the robot of FIG. 1A detecting a crop plant.
Figure 1C:
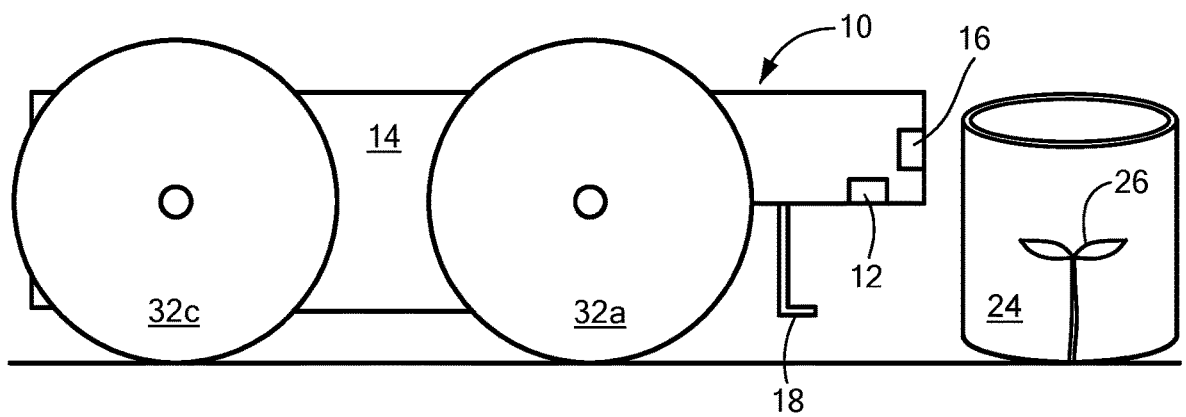
FIG. 1C is a schematic side view of the robot of FIGS. 1A and 1B detecting a sleeve placed around a crop plant seedling.
Figure 2:
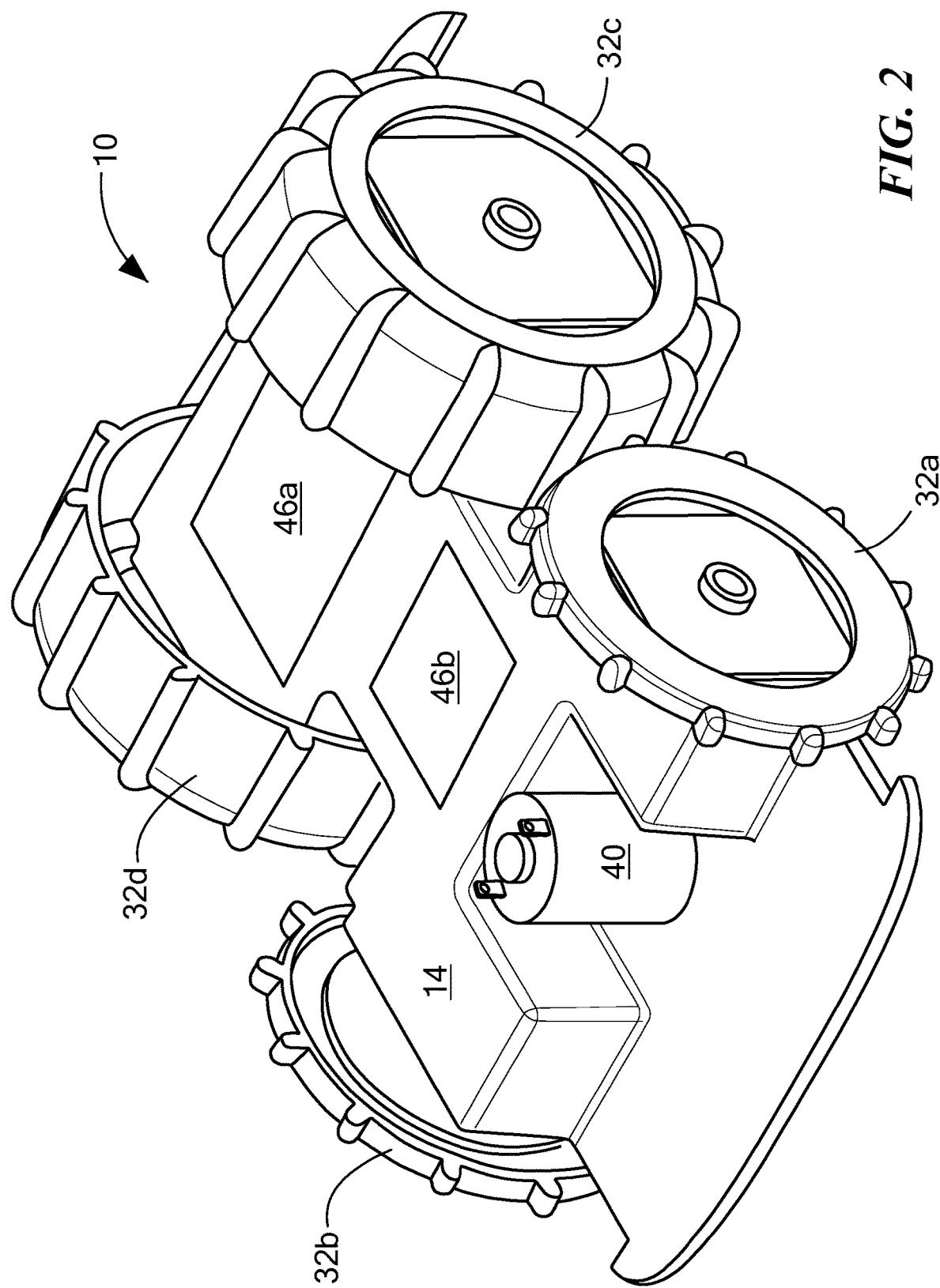
FIG. 2 is a schematic three dimensional view of an example of a weeding robot in accordance with the invention.
Figure 3:
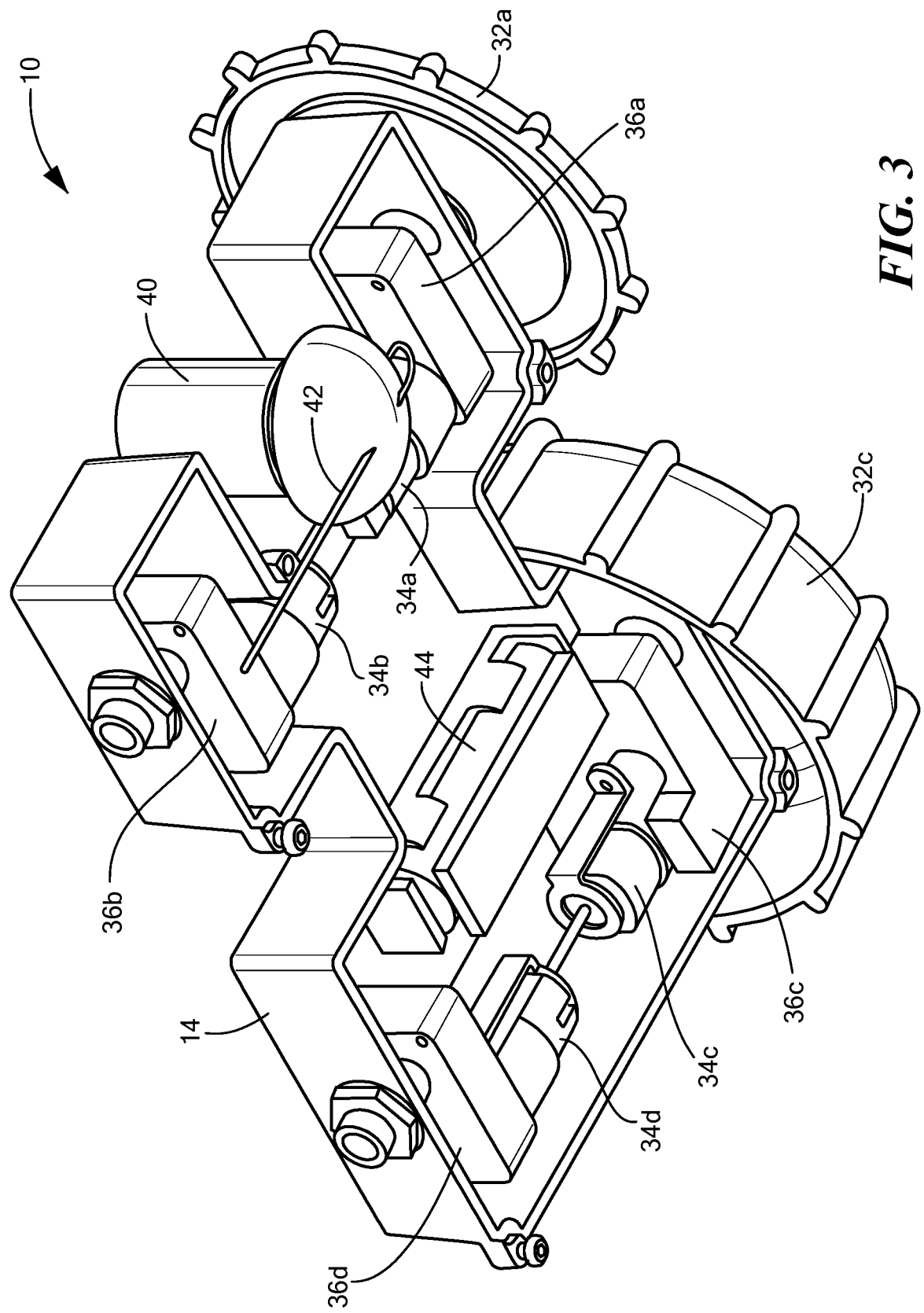
FIGS. 3 and 4 are schematic bottom views of the robot of FIG. 2.
Figure 4:
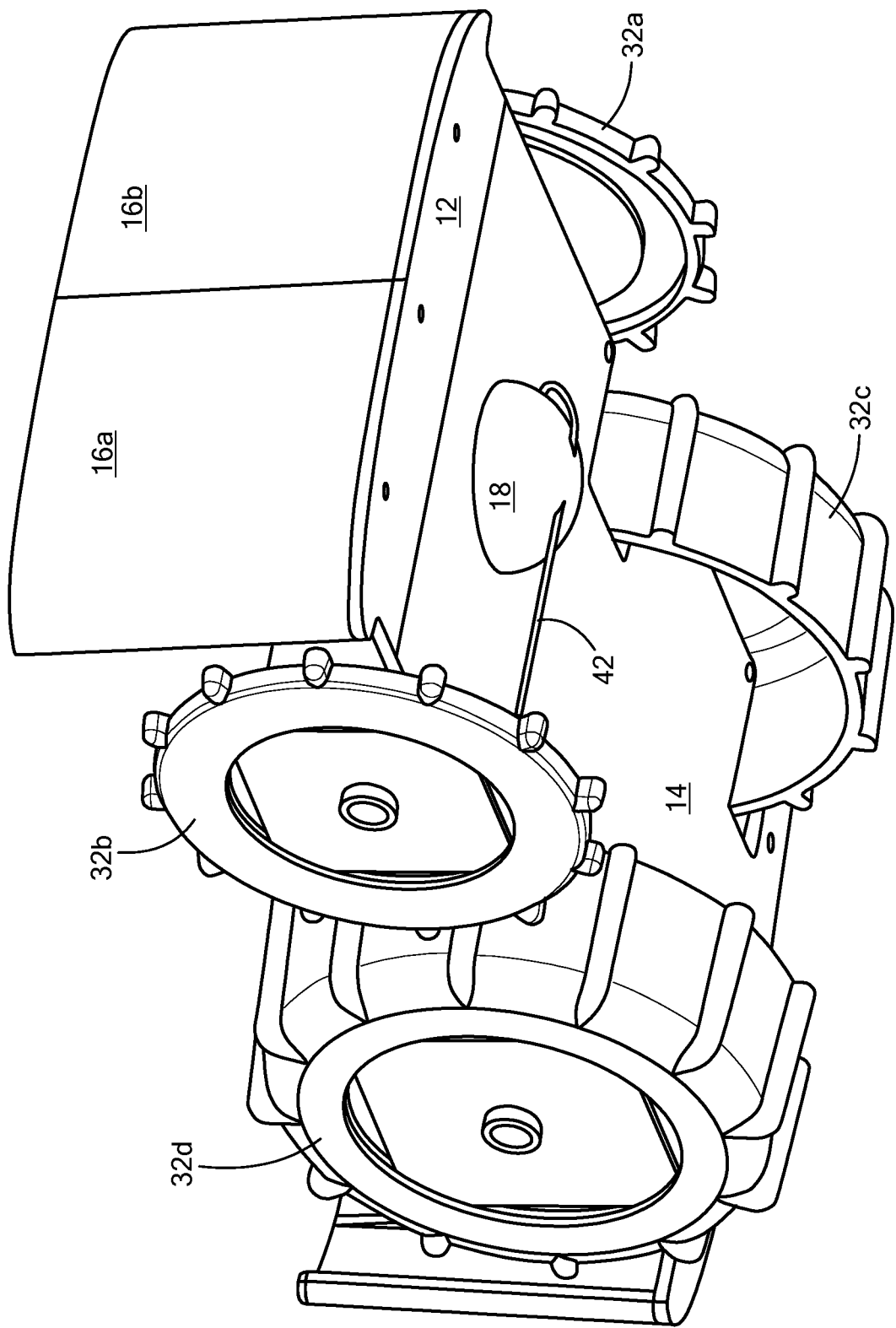
Figure 5:
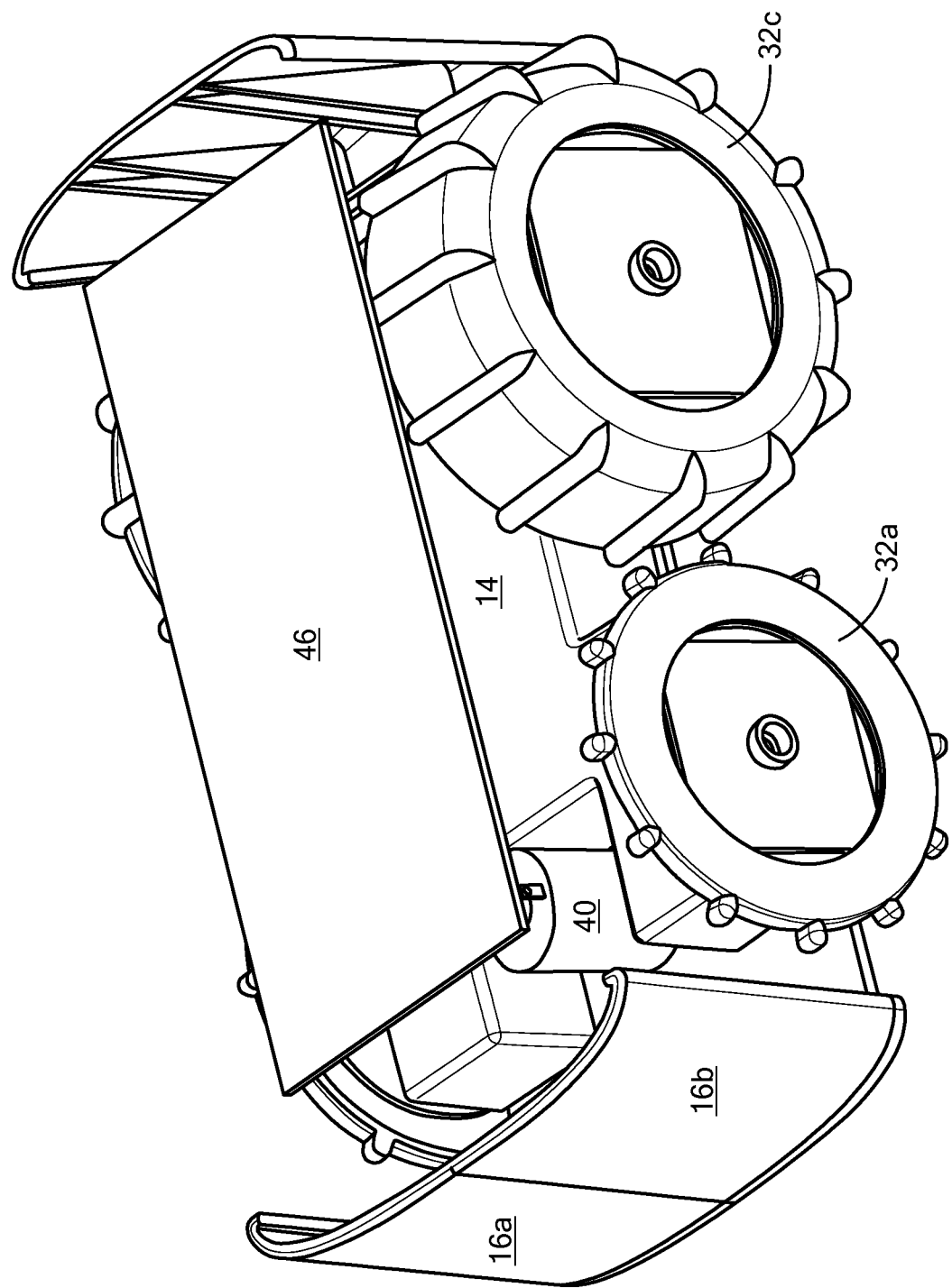
FIG. 5 is another view of the robot of FIGS. 2-4.

When robot 10, FIG. 1B encounters crop plant 22, crop/obstacle sensor 16 now detects the presence of crop plant 22 and robot 10 turns and maneuvers away from crop plant 22. The weed cutter is not energized. In FIG. 1C, the same result occurs if the robot 10 encounters an obstacle, fence, and/or a conductive sleeve 24 placed around crop plant seedling 26.

The drive subsystem of robot 10, FIGS. 2-5 may include four driven wheels 32a-32d and four corresponding wheel drive gearboxes 34a-34d each with its own drive motor controller (not shown). Other drive subsystems may be used. The preferred weed cutting subsystem includes motor 40 driving a line segment 42. Chassis 14 also carries battery 44 charged by one or more solar cells 46a, 46b, and one or more circuit boards for the controller subsystem. The weed sensor 12 is shown and the crop/obstacle sensors 16a, 16b are forward of the robot.

Figure 6:
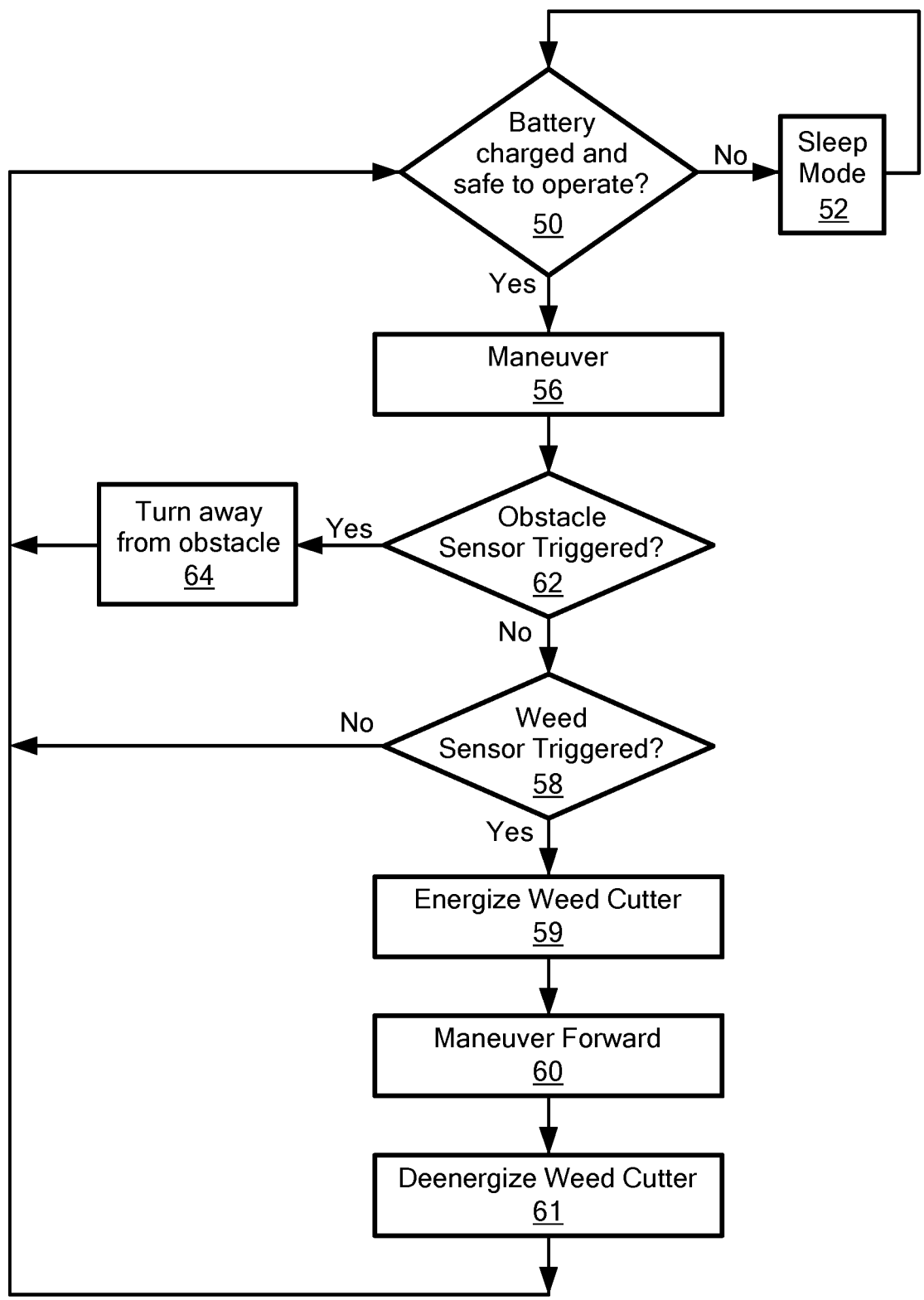
FIG. 6 is a flow chart depicting the primary steps associated with an exemplary method of the invention and also describing an example of the primary programming logic of the controller subsystem of a robot.

As shown in FIG. 6, the controller subsystem is configured to determine if the battery is charged, step 50 and if not, then to enter a sleep mode, step 52 wherein the robot remains stationary in the garden.

When the battery is sufficiently charged above a predetermined level (e.g., 80%), the controller subsystem controls the drive wheel motors so that the robot maneuvers about the garden preferably in a random fashion for complete coverage, step 56.

When the controller subsystem receives a signal from the weed sensor, step 58, the controller subsystem energizes the weed cutting motor, step 59, and may control the drive wheel motors to drive the robot forward, step 60, over the weed, cutting it. After a predetermined distance traveled and/or after a predetermined time of travel, the controller subsystem de-energizes the weed cutter motor, step 61. In other embodiments, the chassis is not maneuvered forward in order to cut the weed. Then, the weed cutting motor is de-energized after a predetermined time.

As shown in step 62-64, if the controller subsystem receives a signal from the crop/obstacle sensor, the controller subsystem controls the drive wheel motors to turn and steer away from the crop/obstacle. The weed cutter motor is not energized. In other designs, microcontrollers, application specific integrated circuitry, or the like are used. The controller subsystem preferably includes computer instructions stored in an on-board memory executed by a processor or processors. The computer instructions are designed and coded per the flow chart of FIG. 6 and the explanation herein.

Thus, the robot maneuvers about the garden on a periodic basis automatically cutting weeds and avoiding crops, seedlings, and obstacles. The robot may be 6 to 7 inches wide and 9 to 10 inches long to allow operation in rows of crops. The chassis may also be round (e.g., 7-8 inches in diameter). The robot may weigh approximately 1 kilogram to avoid soil compaction. The robot chassis is preferably configured so the weed sensors are about 1 inch off the ground and the crop/obstacle sensor(s) are about 1½ inch off the ground. The weed cutting line may be 0.5 inches off the ground. Upstanding forward facing right 16a, FIG. 4 and upstanding forward facing left front 16b crop/obstacle sensors may be used and the robot is turned right if the left sensor detects a crop/obstacle and left if the right sensor detects a crop/obstacle. Rear mounted sensors may also be used. In other embodiments, the weed sensor is not included and the weed cutting subsystem is operated whenever the robot is maneuvering.

Figure 7:
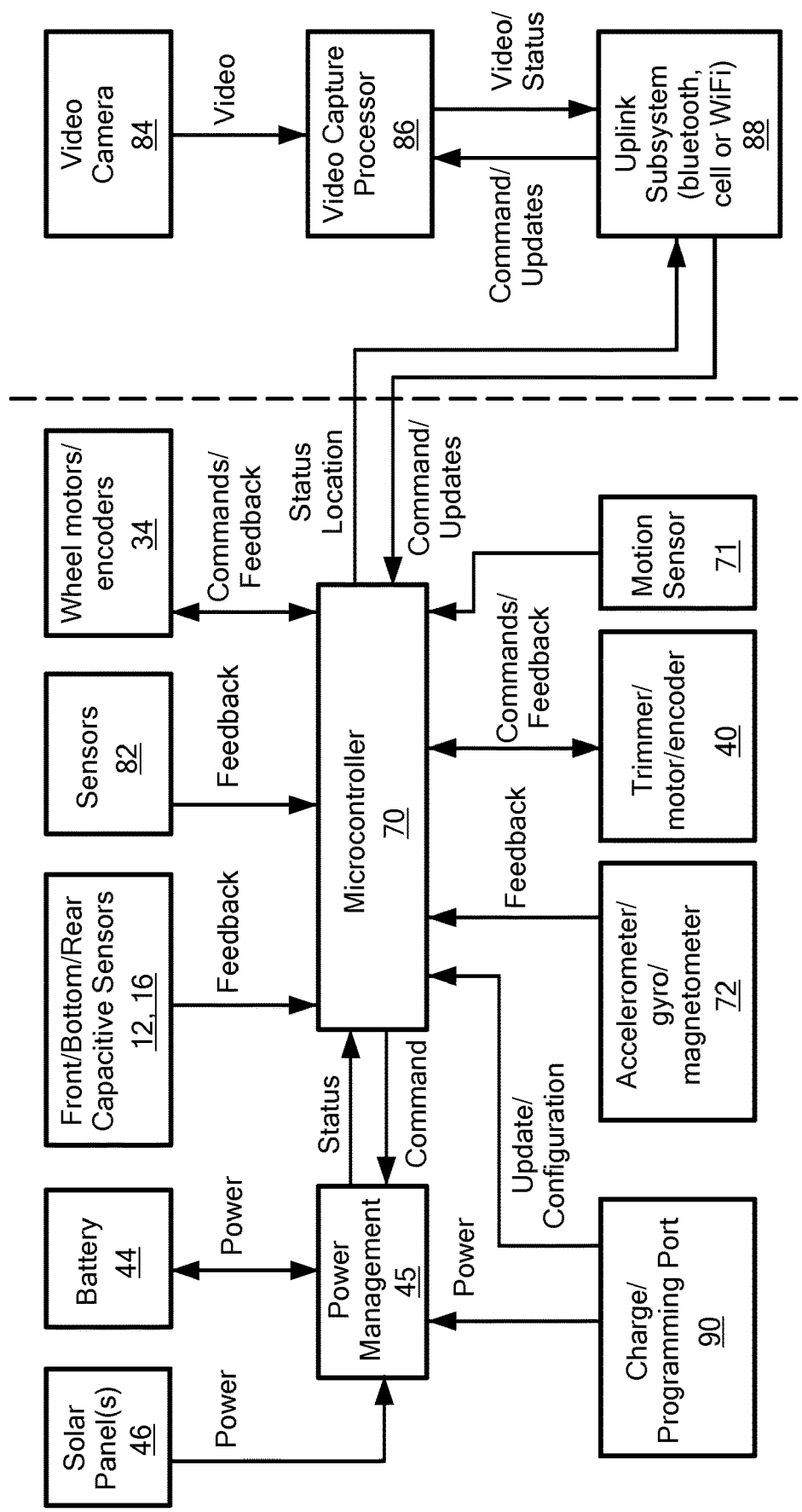
FIG. 7 is a block diagram showing the primary components associated with the robot of FIGS. 2-5.
Figure 8:
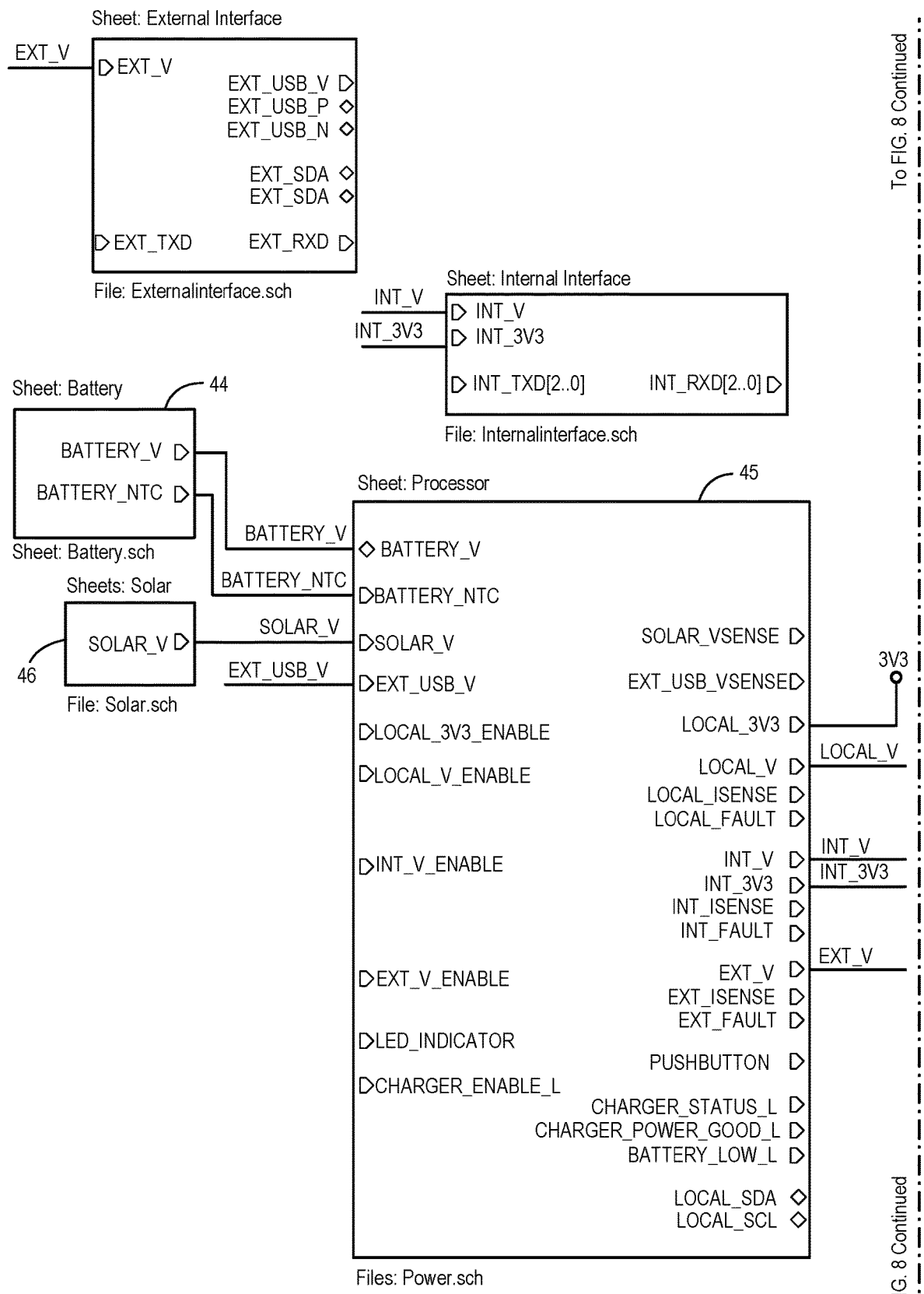
FIG. 8 is a block diagram depicting the primary components associated with the electronic circuitry of the robot.
Figure 8:
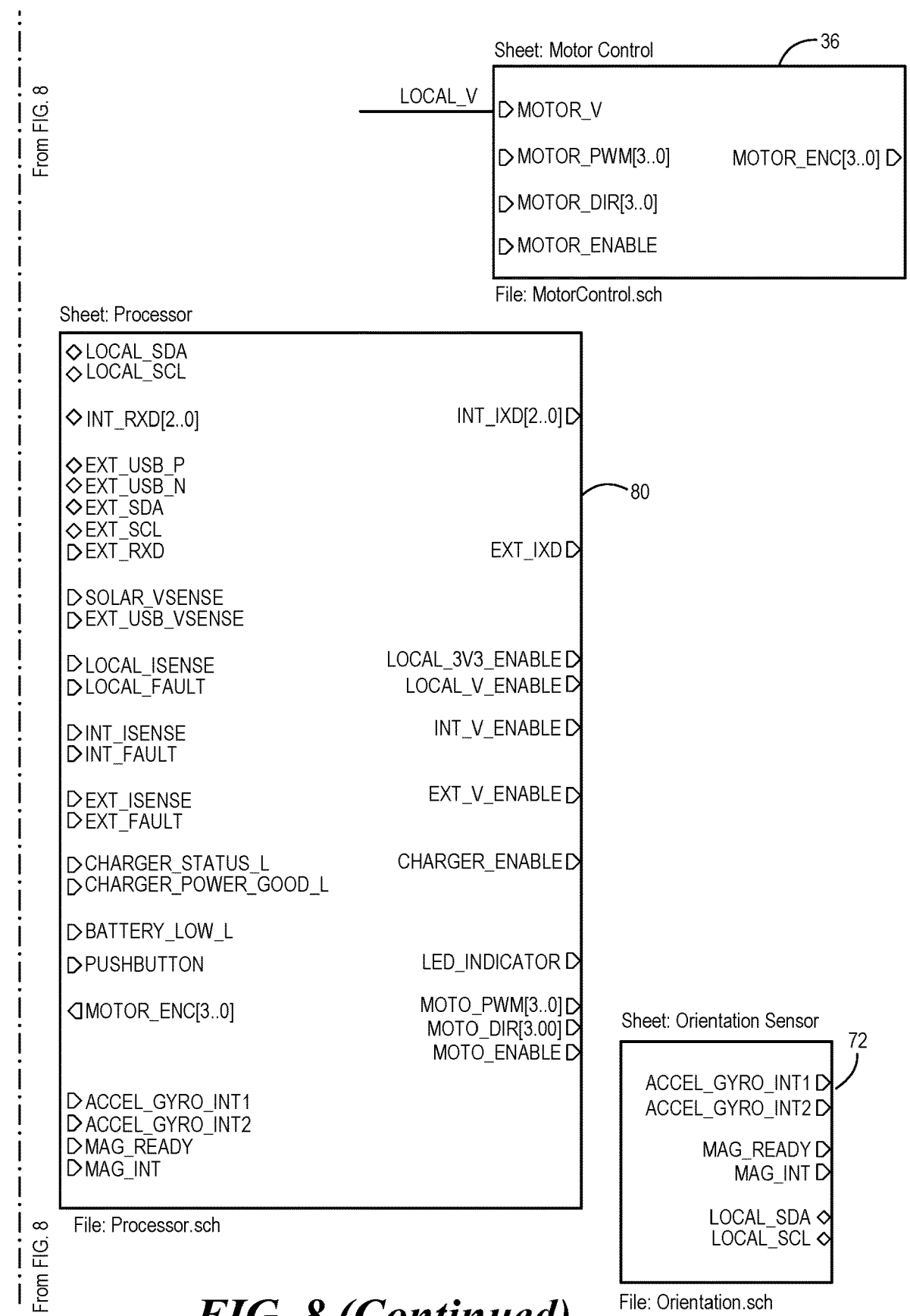

FIG. 7 shows controller subsystem 70 controlling drive motors 34 and weed cutting motor 40 based on inputs from the weed sensor(s) 12, the crop/obstacle sensor(s) 16 and optional motion sensor 71. An optional navigation subsystem 72 may be also included with accelerometers and/or gyroscopes. In one example, the controller subsystem includes a processor 80, FIG. 8. FIGS. 7-8 also show power management controller 45. Further included may be one or more environmental sensors 82, FIG. 7, an imager such as a video camera 84, a video capture processor 86, and an uplink subsystem (e.g., Bluetooth, cellular, or Wi-Fi), 88. FIG. 7 also shows charge and programming port 90.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A weeding robot comprising:
a chassis;
a drive subsystem, for maneuvering the chassis, including a set of motor-driven wheels, at least one wheel of the set having a ground-contacting tread with a set of cleats;
a rechargeable battery configured to power the drive subsystem;
a solar panel configured to charge the battery;
an obstacle sensor subsystem on the chassis configured to detect objects including plants having a height above a threshold;
a controller subsystem, configured for autonomous operation of the robot for weeding, responsive to the obstacle sensor subsystem and configured to:
de-energize the drive subsystem until charge of the battery has been restored to a predetermined level by the solar panel,
control the drive subsystem to maneuver the chassis about a defined space, and
upon detection of an obstacle via an output of the obstacle sensor subsystem, control the drive subsystem to maneuver the chassis away from the obstacle, under rules configured to produce a high likelihood of operation of the robot over the entire defined space.

2. The weeding robot of claim 1, further comprising a motorized cutting subsystem, and wherein the controller subsystem is further configured to de-energize the motorized cutting subsystem after the chassis has moved a predetermined distance and/or after a predetermined period of time.

3. The weeding robot of claim 1 wherein the controller subsystem is configured to maneuver the chassis about the defined space in a random pattern.

4. The weeding robot of claim 2 in which the motorized cutting subsystem includes a motor proximate front of the chassis with a shaft carrying a string rotated below the chassis.

5. The weeding robot of claim 1, wherein each wheel in the drive subsystem is separately powered by a distinct motor.

6. The weeding robot of claim 1, wherein the obstacle sensor subsystem includes a capacitance proximity sensor.

7. The weeding robot of claim 1, wherein the obstacle sensor subsystem includes right and left forward mounted capacitance sensors.

8. The weeding robot of claim 7, wherein the right and left forward mounted capacitance sensors are capaciflector proximity sensors.

9. The weeding robot of claim 1, wherein the controller subsystem is configured to maneuver the chassis about the defined space in a deterministic pattern.

10. A weeding robot comprising:
a chassis;
a drive subsystem, for maneuvering the chassis;
a rechargeable battery configured to power the drive subsystem;
a solar panel configured to charge the battery;
an obstacle sensor subsystem on the chassis configured to detect objects including plants having a height above a threshold;
a controller subsystem configured for autonomous operation of the robot for weeding, responsive to the obstacle sensor subsystem and configured to:
de-energize the drive subsystem until charge of the battery has been restored to a predetermined level by the solar panel;
control the drive subsystem to maneuver the chassis about a defined space, and
upon detection of an obstacle via an output of the obstacle sensor subsystem, control the drive subsystem to maneuver the chassis away from the obstacle, under rules configured to produce a high likelihood of operation of the robot over the entire defined space.

11. A weeding robot comprising:
a chassis;
a drive subsystem, for maneuvering the chassis;
an obstacle sensor subsystem on the chassis configured to detect objects including plants having a height above a threshold;
a controller subsystem configured for autonomous operation of the robot for weeding, responsive to the obstacle sensor subsystem and configured to:
control the drive subsystem to maneuver the chassis about a defined space, and upon detection of an obstacle via an output of the obstacle sensor subsystem, control the drive subsystem to maneuver the chassis away from the obstacle, under rules configured to produce a high likelihood of operation of the robot over the entire defined space.

\* \* \* \* \*